US012277419B2

(12) United States Patent
Heinecke et al.

(10) Patent No.: US 12,277,419 B2
(45) Date of Patent: Apr. 15, 2025

(54) APPARATUSES, METHODS, AND SYSTEMS FOR INSTRUCTIONS TO CONVERT 16-BIT FLOATING-POINT FORMATS

(71) Applicant: Intel Corporation, Santa Clara, CA (US)

(72) Inventors: Alexander F. Heinecke, San Jose, CA (US); Robert Valentine, Kiryat Tivon (IL); Mark J. Charney, Lexington, MA (US); Menachem Adelman, Haifa (IL); Christopher J. Hughes, Santa Clara, CA (US); Evangelos Georganas, San Mateo, CA (US); Zeev Sperber, Zichron Yackov (IL); Amit Gradstein, Binyamina (IL); Simon Rubanovich, Haifa (IL)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 17/134,046

(22) Filed: Dec. 24, 2020

(65) Prior Publication Data
US 2022/0100507 A1    Mar. 31, 2022

Related U.S. Application Data

(60) Provisional application No. 63/083,906, filed on Sep. 26, 2020.

(51) Int. Cl.
*G06F 9/30*    (2018.01)
(52) U.S. Cl.
CPC ...... *G06F 9/30025* (2013.01); *G06F 9/30036* (2013.01); *G06F 9/30038* (2023.08); *G06F 9/30101* (2013.01)

(58) Field of Classification Search
CPC ............ G06F 9/30025; G06F 9/30036; G06F 9/30018; G06F 5/012; G06F 7/483; G06F 9/0014; G06F 9/30101; G06F 9/30038
See application file for complete search history.

(56) References Cited

U.S. PATENT DOCUMENTS 6,212,627 B1    4/2001 Dulong et al.
2019/0042243 A1*  2/2019 Tang ................... G06F 9/30025
(Continued)

OTHER PUBLICATIONS

"BFLOAT16-Hardware Numerics Definition", November, Intel, pp. 5-7 (Year: 2018).*
(Continued)

*Primary Examiner* — Courtney P Spann
(74) *Attorney, Agent, or Firm* — NICHOLSON DE VOS WEBSTER & ELLIOTT LLP

(57) ABSTRACT

Systems, methods, and apparatuses relating to instructions to convert 16-bit floating-point formats are described. In one embodiment, a processor includes fetch circuitry to fetch a single instruction having fields to specify an opcode and locations of a source vector comprising N plurality of 16-bit half-precision floating-point elements, and a destination vector to store N plurality of 16-bit bfloat floating-point elements, the opcode to indicate execution circuitry is to convert each of the elements of the source vector from 16-bit half-precision floating-point format to 16-bit bfloat floating-point format and store each converted element into a corresponding location of the destination vector, decode circuitry to decode the fetched single instruction into a decoded single instruction, and the execution circuitry to respond to the decoded single instruction as specified by the opcode.

18 Claims, 21 Drawing Sheets

(56) References Cited

U.S. PATENT DOCUMENTS

| | | | |
|---|---|---|---|
| 2019/0042544 A1* | 2/2019 | Kashyap | G06F 17/16 |
| 2019/0079762 A1* | 3/2019 | Heinecke | G06F 9/30014 |
| 2019/0079767 A1* | 3/2019 | Heinecke | G06F 9/3001 |
| 2019/0079768 A1 | 3/2019 | Heinecke et al. | |
| 2019/0220278 A1* | 7/2019 | Adelman | G06F 9/30036 |
| 2021/0255830 A1* | 8/2021 | Ulrich | G06F 7/4876 |

OTHER PUBLICATIONS

Nick Higham, "Half Precision Arithmetic: fp16 Versus bfloat16", Apr. 23, pp. 1-3 (Year: 2020).*

Anonymous, "Accelerating Floating Point Computation in CPUs", October, Technical Disclosure Commons, pp. 10-12 (Year: 2023).*

Wikipedia contributors, Bfloat16 floating-point format, Aug. 21, Wikipedia, The Free Encyclopedia, retrieved from: https://en.wikipedia.org/w/index.php?title=Bfloat16_floating-point_format&oldid=974208758 (Year: 2020).*

Ramarao, Pramod, "CUDA 11 Features Revealed", NVIDIA Developer, NVIDIA Developer Blog, Available Online at <https://developer.nvidia.com/blog/cuda-11-features-revealed/>, May 14, 2020, 18 pages.

European Search Report and Search Opinion, EP App. No. 21192634.0, Jan. 24, 2022, 9 pages.

Office Action, EP App. No. 21192634.0, Mar. 13, 2024, 7 pages.

\* cited by examiner

Instruction 301

| Opcode<br>VCVTNEPH2BF16*<br>302 | Destination<br>Location<br>(reg / mem)<br>304 | Source<br>Location<br>(reg / tile / mem)<br>306 | {k}<br>308 | {Z}<br>310 |

PSEUDOCODE FOR EVEX ENCODED VERSION 315

```
VCVTNEPH2BF16 dest, src        // EVEX ENCODED VERSION
VL = (128,256,512)
KL := VL/16 origdest := dest
for i := 0 to kl-1:
    if k1[i] or *no writemask*:
        if src is memory and evex.b == 1:
            t := src.fp16[0]
        else:
            t := src.fp16[i]

f := convert_fp16_to_fp32(t,mxcsr) // mxcsr for exception info
        dest.word[i] := convert_fp32_to_bfloat16(f) // else if *zeroing*:
        dest.word[i] := 0
    else: // merge masking, dest element unchanged
        dest.word[i] := origdest.word[i]
dest[max_vl-1:vl] := 0
```

PSEUDOCODE FOR VEX ENCODED VERSION 325

```
VCVTNEPH2BF16 dest, src        // VEX ENCODED VERSION
VL = (128,256)
KL := VL/16 for i := 0 to kl-1:
    f := convert_fp16_to_fp32(src.fp16[i],mxcsr) // mxcsr for exception info
    dest.word[i] := convert_fp32_to_bfloat16(f) // dest[max_vl-1:vl] := 0
```

FIG. 3A

Instruction 321

| Opcode<br>VCVTBF162PH*<br>322 | Destination<br>Location<br>(reg / mem)<br>324 | Source<br>Location<br>(reg / tile / mem)<br>326 | {k}<br>328 | {Z}<br>330 |

PSEUDOCODE FOR EVEX ENCODED VERSION 335

```
VCVTBF162PH dest, src    // EVEX ENCODED VERSION

VL = (128,256,512)
KL := VL/16 origdest := dest
for i := 0 to kl-1:
    if k1[i] or *no writemask*:
        if src is memory and evex.b == 1:
            t := src.bf16[0]
        else:
            t := src.bf16[i]
        u := make_fp32(t)
        dest.word[i] := convert_fp32_to_fp16(u,mxcsr)

else if *zeroing*:
        dest.word[i] := 0
    else: // merge masking, dest element unchanged
        dest.word[i] := origdest.word[i]

dest[max_vl-1:vl] := 0
```

PSEUDOCODE FOR VEX ENCODED VERSION 345

```
VCVTBF162PH dest, src    // VEX ENCODED VERSION

VL = (128,256)
KL := VL/16
for i := 0 to kl-1:
    u := make_fp32(src.bf16[i])
    dest.word[i] := convert_fp32_to_fp16(u,mxcsr)

dest[max_vl-1:vl] := 0
```

FIG. 3B

```
Pseudocode
    340
Helper Function
define convert_fp32_to_bfloat16(x):
if x is zero or denormal:
        dest[15] := x[31] // sign preserving zero (denormal go to zero)
        dest[14:0] := 0
else if x is infinity:
        dest[15:0] := x[31:16]
else if x is not a number (NaN):
        dest[15:0] := x[31:16] // truncate and set MSB of the mantisa force quiet
                                // NAN (QNAN)
        dest[7] := 1
else // normal number
        lsb := x[16]
        rounding_bias := 0x00007FFF + LSB
        temp[31:0] := x[31:0] + rounding_bias // integer add
        dest[15:0] := temp[31:16]
return dest
```

FIG. 3C

Instruction 401

| Opcode<br>VCVTNEPH2BF16*<br>402 | Destination<br>Location<br>(reg / mem)<br>404 | Source<br>Location<br>(reg / tile / mem)<br>406 |

400 

FETCH, USING FETCH CIRCUITRY, A SINGLE INSTRUCTION HAVING FIELDS TO SPECIFY AN OPCODE AND LOCATIONS OF A SOURCE VECTOR COMPRISING N PLURALITY OF 16-BIT HALF-PRECISION FLOATING-POINT ELEMENTS, AND A DESTINATION VECTOR TO STORE N PLURALITY OF 16-BIT BFLOAT FLOATING-POINT ELEMENTS, THE OPCODE TO INDICATE EXECUTION CIRCUITRY IS TO CONVERT EACH OF THE ELEMENTS OF THE SOURCE VECTOR FROM 16-BIT HALF-PRECISION FLOATING-POINT FORMAT TO 16-BIT BFLOAT FLOATING-POINT FORMAT AND STORE EACH CONVERTED ELEMENT INTO A CORRESPONDING LOCATION OF THE DESTINATION VECTOR
421

DECODE, USING DECODE CIRCUITRY, THE FETCHED INSTRUCTION
423

SCHEDULE EXECUTION OF THE DECODED INSTRUCTION
425

RESPOND, USING EXECUTION CIRCUITRY, TO THE DECODED INSTRUCTION AS SPECIFIED BY THE OPCODE
427

COMMIT A RESULT OF THE EXECUTED INSTRUCTION
429

FIG. 4A

Instruction 451

| Opcode<br>VCVTBF162PH*<br>452 | Destination<br>Location<br>(reg / mem)<br>454 | Source<br>Location<br>(reg / tile / mem)<br>456 |
|---|---|---|

450

FETCH, USING FETCH CIRCUITRY, A SINGLE INSTRUCTION HAVING FIELDS TO SPECIFY AN OPCODE AND LOCATIONS OF A SOURCE VECTOR COMPRISING N PLURALITY OF 16-BIT BFLOAT FLOATING-POINT ELEMENTS, AND A DESTINATION VECTOR TO STORE N PLURALITY OF 16-BIT HALF-PRECISION FLOATING-POINT ELEMENTS, THE OPCODE TO INDICATE EXECUTION CIRCUITRY IS TO CONVERT EACH OF THE ELEMENTS OF THE SOURCE VECTOR FROM 16-BIT BFLOAT FLOATING-POINT FORMAT TO 16-BIT HALF-PRECISION FLOATING-POINT FORMAT AND STORE EACH CONVERTED ELEMENT INTO A CORRESPONDING LOCATION OF THE DESTINATION VECTOR
471

↓

DECODE, USING DECODE CIRCUITRY, THE FETCHED INSTRUCTION
473

↓

SCHEDULE EXECUTION OF THE DECODED INSTRUCTION
475

↓

RESPOND, USING EXECUTION CIRCUITRY, TO THE DECODED INSTRUCTION AS SPECIFIED BY THE OPCODE
477

↓

COMMIT A RESULT OF THE EXECUTED INSTRUCTION
479

FIG. 4B

VCVTNEPH2BF16 Instruction 500

| Opcode VCVTNEPH2BF16 * 502 | Destination Location (reg / mem) 504 | Source Location (reg / mem) 506 | Mask {k} 508 | Zeroing {Z} 510 | Element Format 514 | Vector Size (N) 516 | Rounding Mode 518 |

FIG. 5A

VCVTBF162PH Instruction 550

| Opcode VCVTBF162PH* 552 | Destination Location (reg / mem) 554 | Source Location (reg / mem) 556 | Mask {k} 558 | Zeroing {Z} 560 | Element Format 564 | Vector Size (N) 566 | Rounding Mode 568 |

FIG. 5B

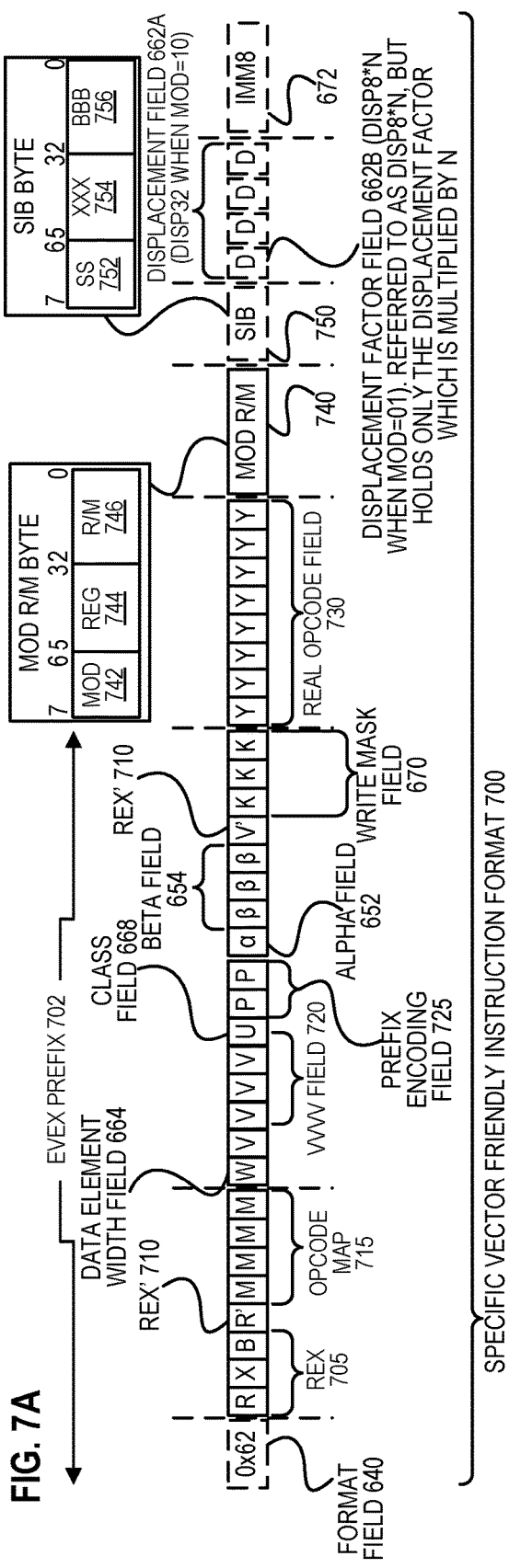
FIG. 7A
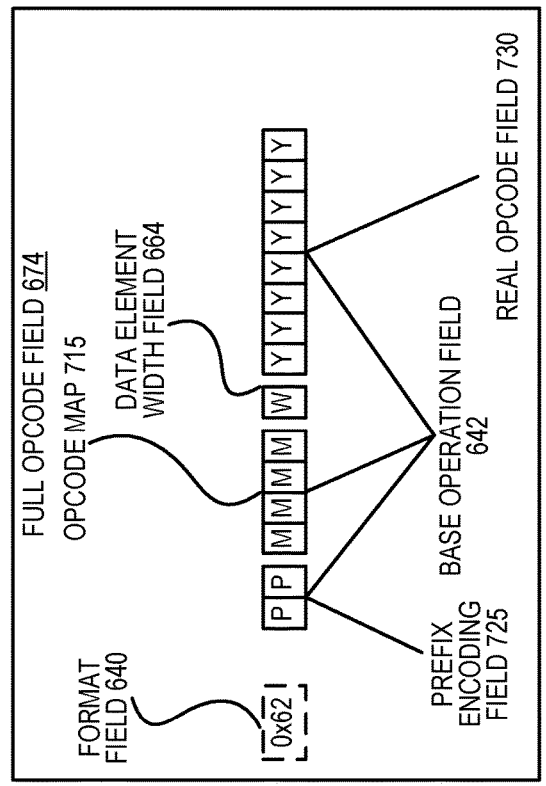
FIG. 7B
FIG. 7C

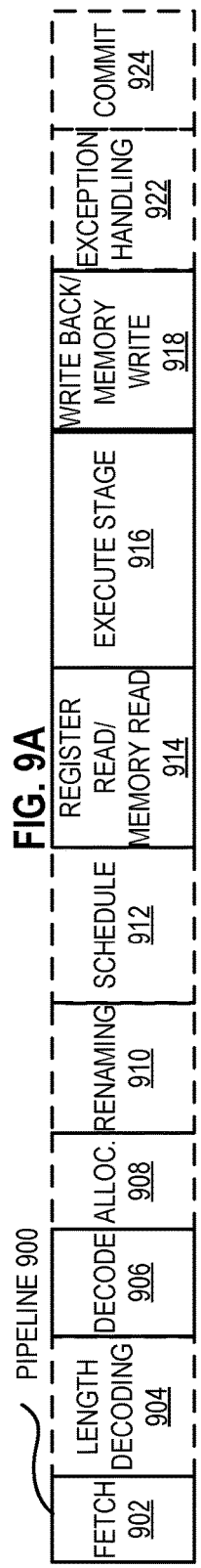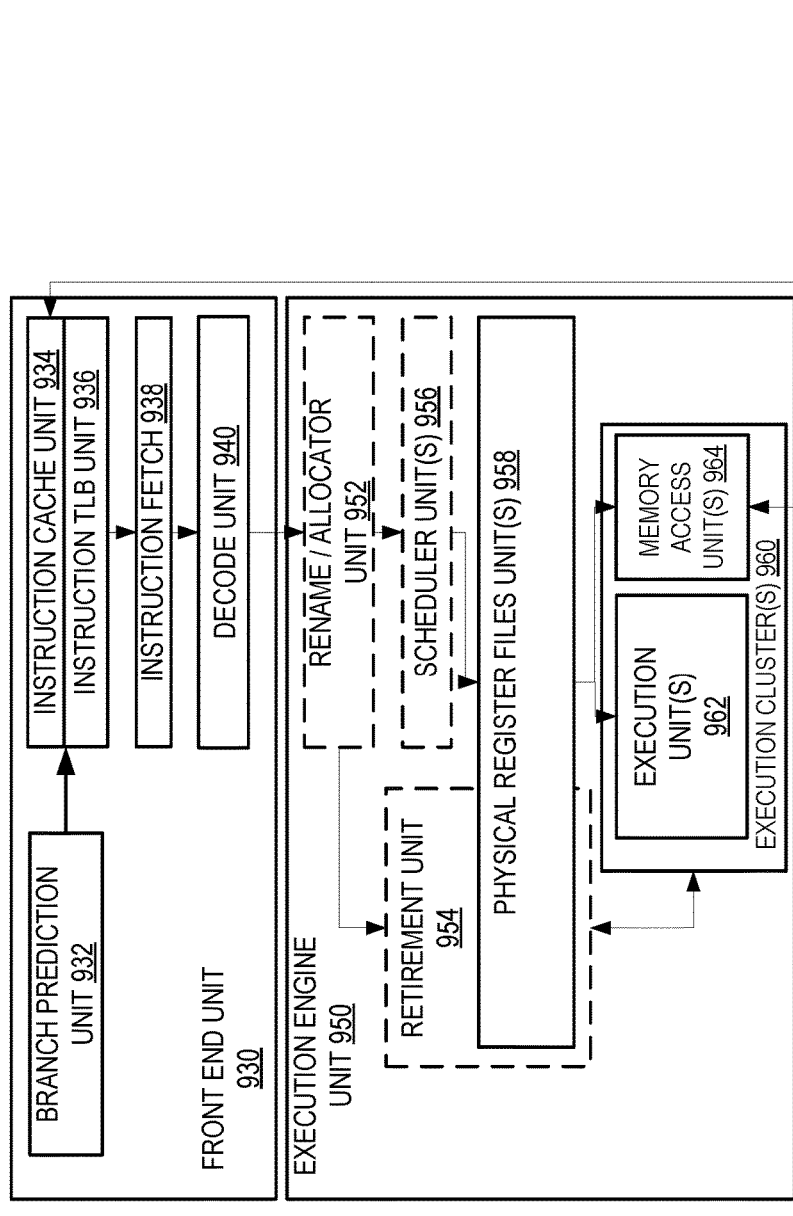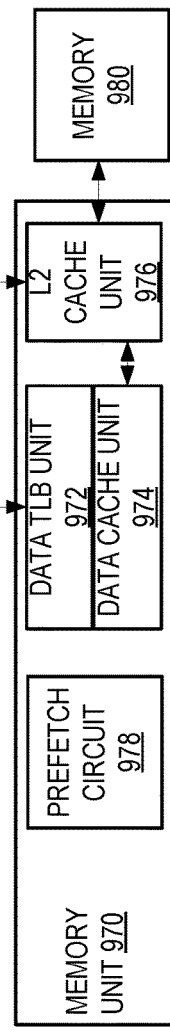

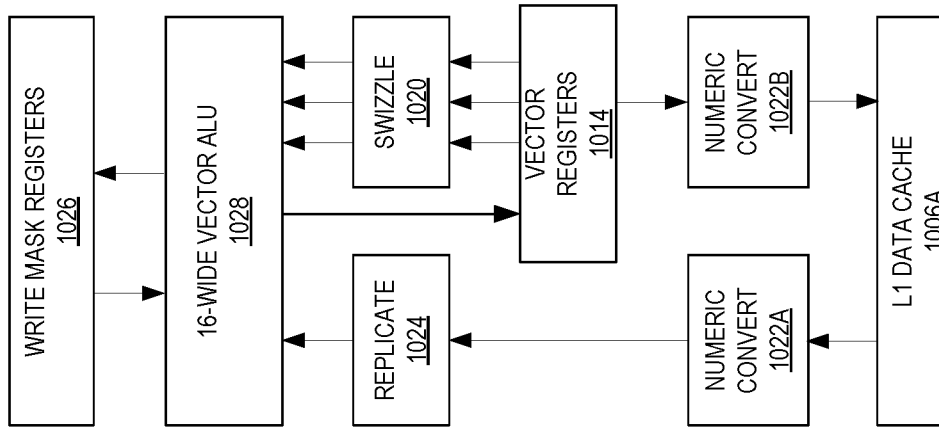
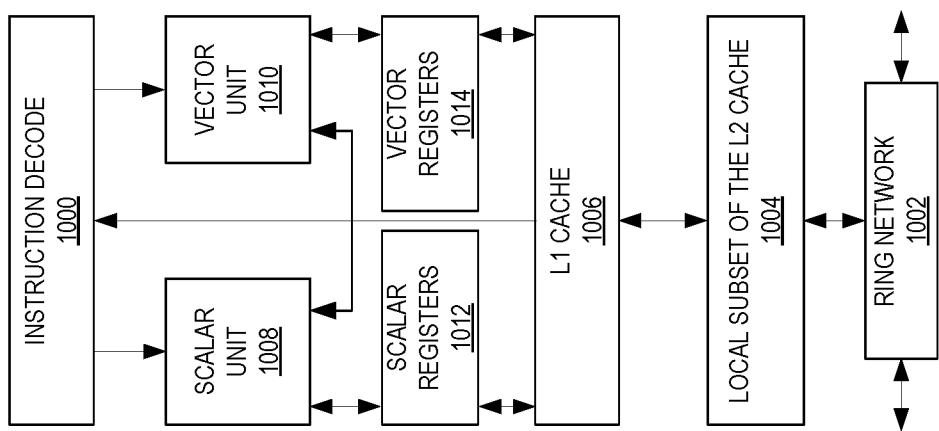

US 12,277,419 B2

APPARATUSES, METHODS, AND SYSTEMS FOR INSTRUCTIONS TO CONVERT 16-BIT FLOATING-POINT FORMATS

CROSS-REFERENCE TO RELATED APPLICATIONS

The present patent application claims the benefit of U.S. Provisional Patent Application No. 63/083,906, filed Sep. 26, 2020, and titled: "Apparatuses, Methods, and Systems for Instructions to Convert 16-Bit Floating-Point Formats", which is incorporated herein by reference in its entirety.

TECHNICAL FIELD

The disclosure relates generally to electronics, and, more specifically, an embodiment of the disclosure relates to circuitry to implement an instruction to convert 16-bit floating-point formats.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3A illustrates exemplary first instruction format (e.g., EVEX) encoding pseudocode and exemplary second instruction format (e.g., VEX) encoding pseudocode for a VCVTNEPH2BF16 instruction according to embodiments of the disclosure.

FIG. 3B illustrates exemplary first instruction format (e.g., EVEX) encoding pseudocode and exemplary second instruction format (e.g., VEX) encoding pseudocode for a VCVTBF162PH instruction according to embodiments of the disclosure.

FIG. 3C illustrates exemplary pseudocode of a helper function for use with the pseudocode of FIGS. 3A and 3B according to embodiments of the disclosure.

FIG. 4A illustrates a method of processing a VCVTNEPH2BF16 instruction according to embodiments of the disclosure.

FIG. 4B illustrates a method of processing a VCVTBF162PH instruction according to embodiments of the disclosure.

FIG. 5A is a block diagram illustrating a format of a VCVTNEPH2BF16 instruction according to embodiments of the disclosure.

FIG. 5B is a block diagram illustrating a format of a VCVTBF162PH instruction according to embodiments of the disclosure.

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

FIG. 10A is a block diagram of a single processor core, along with its connection to the on-die interconnect network and with its local subset of the Level 2 (L2) cache, according to embodiments of the disclosure.

FIG. 10B is an expanded view of part of the processor core in FIG. 10A according to embodiments of the disclosure.

DETAILED DESCRIPTION

Figure 1:
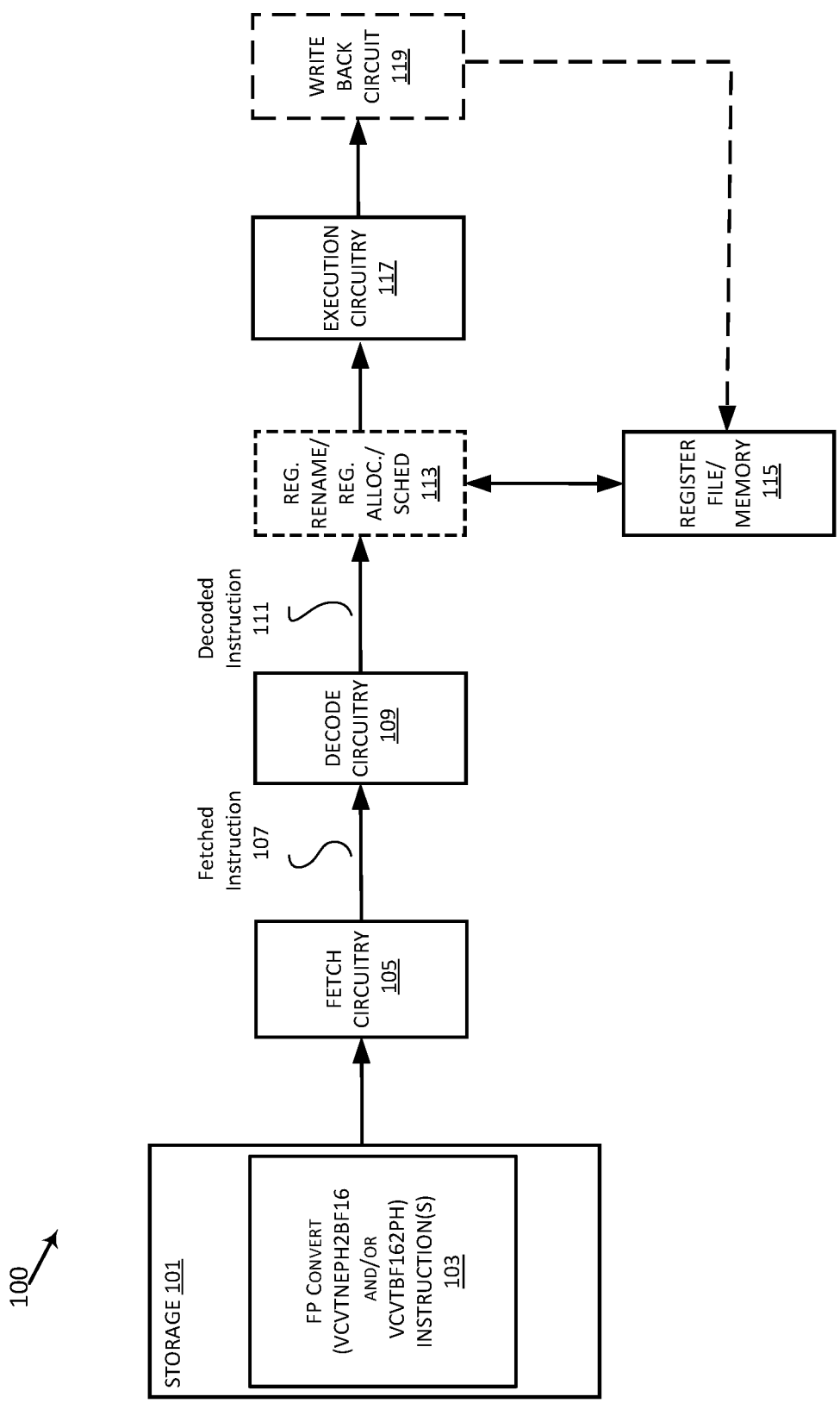
FIG. 1 illustrates a hardware processor coupled to storage that includes one or more format-convert (VCVTNEPH2BF16 or VCVTBF162PH) instructions according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a conversion operation. For example, a computing system forming a neural network may include numerous multiplication operands where one or more of the input values is in a first format and the operation is performed in a second format. In certain embodiments, one format is a sixteen bit wide Institute of Electrical and Electronics Engineers (IEEE) (e.g., IEEE 754 standard) half-precision binary floating-point format (IEEE float16) having a sign field (one bit wide), an exponent field (five bits wide), and a mantissa (significand precision) field (eleven bits implicitly stored, i.e., ten bits wide explicitly stored). In certain embodiments, one format is a sixteen bit wide, brain floating point format (bfloat16) having a sign field (one bit wide), an exponent field (eight bits wide), and a mantissa (significand precision) field (eight bits implicitly stored, i.e., seven bits wide explicitly stored). In certain embodiments, mantissa (significand precision) field is presumed to have an implicit leading bit with value of one, unless the exponent field is stored with all zeros. Further, 32-bit floating-point formats may include binary32 (according to an IEEE standard), which is sometimes referred to herein as "single-precision" or "fp32", e.g., having a sign field (one bit wide), an exponent field (eight bits wide), and a mantissa (significand precision) field (twenty four bits implicitly stored, i.e., twenty three bits wide explicitly stored).

Certain embodiments (e.g., for artificial intelligence) use two different 16-bit floating point formats, e.g., bloat16 and IEEE float16. In certain embodiments, using a 16-bit wide floating-point format instead of a 32-bit wide single-precision format in at least some (e.g., vector) operations alleviate memory utilization and bandwidth issues while providing acceptable performance, for example, in embodiments with bandwidth issues occurring in the various cache levels and memory (e.g., dynamic random-access memory (DRAM)). However, as compute capabilities may speed up significantly (e.g., 8×), memory sub-system capabilities may only be increased modestly. The specific bandwidth issues are workload specific, and can be in DRAM, last level cache (LLC), mid-level cache (MLC), etc. In certain embodiments, machine learning training, for example, achieve convergence with bfloat16 multiplications accumulated into a single-precision result nearly as quickly as when using 32-bit wide, single precision sources in the multiplication as well as the accumulation. In other words, using bfloat16 is "good enough" in certain embodiments, but uses half as much memory footprint and memory bandwidth, resulting not only in cost savings in terms of memory silicon, but also in improved performance due to shorter data transfers.

Certain processors only offer IEEE float16 compute stacks (e.g., execution circuitry) with no bfloat16 compute stack(s). In these processors, to convert a number from bfloat16 to IEEE float16 (or vice versa) requires a detour via the two-times (2×) wider IEEE float32 (e.g., FP32 datatype) execution circuitry (e.g., arithmetic logic unit (ALU)), which slows execution down. Without VCVTNEPH2BF16 instruction and/or VCVTBF162PH instruction, there is no apparent way to "hide" the conversion from the user because software would need to serialize the conversion and the execution, e.g., routing through float32 (e.g., FP32 datatype) execution circuitry due to the mantissa and exponent mismatch of IEEE float16 and bfloat16.

Embodiments herein are directed to circuitry that implements instructions to convert from 16-bit IEEE half-precision format (IEEE float16) to 16-bit bfloat16 format and/or from 16-bit bfloat16 format to 16-bit IEEE half-precision format (IEEE float16) Embodiments herein are directed to conversion infrastructure capable of converting from IEEE float16 to bfloat16 and/or from bfloat16 to IEEE float16 to help balance compute and enable fast 16 bit floating point compute for both formats. In certain embodiments, the instructions that convert from IEEE float16 to bfloat16 and/or from bfloat16 to IEEE float16 convert a vector (e.g., of a 512 bit register) of values (e.g., up to 32 elements where each element is 16 bits wide) to the other/complementing 16 bit floating point format. In certain embodiments, hardware-assisted conversion affords the opportunity to "hide" the conversion infrastructure from software (SW) and an operating system (OS), for example, by performing arithmetic on a converted vector while converting the next vector. The instructions disclosed herein obviate any need for manual hands-on tuning by the users or administrators. The single instructions disclosed herein performing their conversion using that single instruction, e.g., without software utilizing a plurality of instructions with being able to "hide" the conversion behind execution.

Disclosed herein and illustrated by way of the figures is a vector packed data format-convert instruction (VCVTNEPH2BF16 and VCVTNEBF162PH) that implements format conversion of a source vector. In certain embodiments, the VCVTNEPH2BF16 mnemonic indicates: "VCVT"=Vector ConVerT, "NE"=rounding to Nearest Even, "PH"=Packed Half-precision source, "2"=to, and "BF16"=BFloat16. In one embodiment, the instruction takes a source vector having N number of 16-bit half-precision formatted elements (IEEE float16 elements) and generates a destination vector having N number of 16-bit bfloat16 formatted elements. The operands, be they source or destination operands, can be stored in the same type of vector registers, be they 128-bit, 256-bit, or 512-bit vector registers. An exemplary processor register file is illustrated and described at least with respect to FIG. 8 (e.g., vector registers 810). In certain embodiments, these instructions (e.g., VCVTNEPH2BF16 and VCVTBF162PH instructions to convert between half-precision and bfloat16) are formatted for use as an extension to (e.g., AVX and/or EVEX) a single instruction, multiple data (SIMD) instruction set architecture (ISA).

As compared to algorithms that use full-precision for both the source and destination elements, the disclosed format-convert (e.g., VCVTNEPH2BF16 and VCVTNEBF162PH) instructions are expected to achieve comparable quality with IEEE float16 or bfloat16 values, but with reduced memory utilization and memory bandwidth requirements, which would serve to improve performance and power efficiency, especially in a machine learning context.

FIG. 1 illustrates a hardware processor 100 coupled to storage 101 that includes one or more format-convert (VCVTNEPH2BF16 or VCVTBF162PH) instructions 103 according to embodiments of the disclosure. In some embodiments, hardware processor 100 is a SIMD processor to concurrently process multiple elements of packed-data vectors.

In operation, the format-convert instruction(s) 103 is fetched from storage 101 by fetch circuitry 105. In certain embodiments, a format-convert instruction 103 has fields (e.g., as shown in FIGS. 5A and 5B) to specify an opcode and locations of a source vector comprising N number of 16-bit floating-point elements in a first format (e.g., one of a IEEE float16 format or a bfloat16 format), and a destination vector comprising (e.g., exactly) N number of 16-bit floating-point elements in a second, different format (e.g., the other of the IEEE float16 format or the bfloat16 format), the opcode to indicate execution circuitry is to convert each of the elements of the specified source vector to the second, different format (for example, with the conversion including truncation and/or rounding, e.g., as necessary), and store each converted element into a corresponding location of the specified destination vector.

In one embodiment, a half-precision floating-point to bfloat16 floating-point instruction 103 (e.g., VCVTNEPH2BF16 instruction) has fields that specify locations of N number of 16-bit half-precision formatted elements (IEEE float16 elements) and a destination vector to store the resultant N number of 16-bit bfloat16 formatted elements(bfloat16 elements). Example formats for a VCVTNEPH2BF16 instruction are further illustrated and described at least with respect to FIGS. 3A, 4A, and 5A. In one embodiment, an instruction mnemonic of VCVTNEPH2BF16 instructs the processor to perform a conversion as follows:

VCVT (e.g., an AVX512 vector convert),
NE (e.g., nearest even, as an IEEE rounding format applied),
PH (packed IEEE float16),
2 ("to"), and
BF16 (the bfloat16 version of a 16-bit floating-point format)

In one embodiment, a bfloat16 floating-point to half-precision floating-point instruction 103 (e.g., VCVTBF162PH instruction) has fields that specify locations of N number of 16-bit bfloat16 formatted elements (bfloat16 elements) and a destination vector to store the resultant N number of 16-bit half-precision formatted elements (IEEE float16 elements). Example formats for a VCVTBF162PH instruction are further illustrated and described at least with respect to FIGS. 3B, 4B, and 5B. In one embodiment, an instruction mnemonic of VCVTBF162PH instructs the processor to perform a conversion as follows:

VCVT (e.g., AVX512 vector convert),
BF16 (the bfloat16 version of a 16-bit floating-point format),
2 ("to"), and
PH (packed IEEE float16)

In FIG. 1, the fetched format-convert instruction 107 is decoded by decode circuitry 109, which decodes the fetched format-convert (VCVTNEPH2BF16 or VCVTBF162PH) instruction 107 into one or more operations. In some embodiments, this decoding includes generating a plurality of micro-operations to be performed by execution circuitry (such as execution circuitry 117). Decode circuitry 109 also decodes instruction suffixes and prefixes (if used). Execution circuitry 117, which has access to register file and/or memory 115, is to respond to decoded instruction 111 as specified by the opcode. Depending on the implementation, the instruction may include masking features.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded format-convert (VCVTNEPH2BF16 or VCVTBF162PH) instruction 111 for execution on execution circuitry 117 out of an instruction pool (e.g., using a reservation station in some embodiments).

In some embodiments, writeback circuit 119 is to write back results of the executed instruction. Writeback circuit 119 and register rename/scheduling circuit 113 are optional, as indicated by their dashed borders, insofar as they may occur at different times, or not at all.

The decode circuitry 109, execution circuitry 117, and/or register file/memory (e.g., cache) 115, may be of a single core of the processor, e.g., and multiple cores each with an instance of the circuitry may be included. The processor (e.g., and core thereof) may be a processor and/or core according to any of the disclosure herein.

Figure 2:
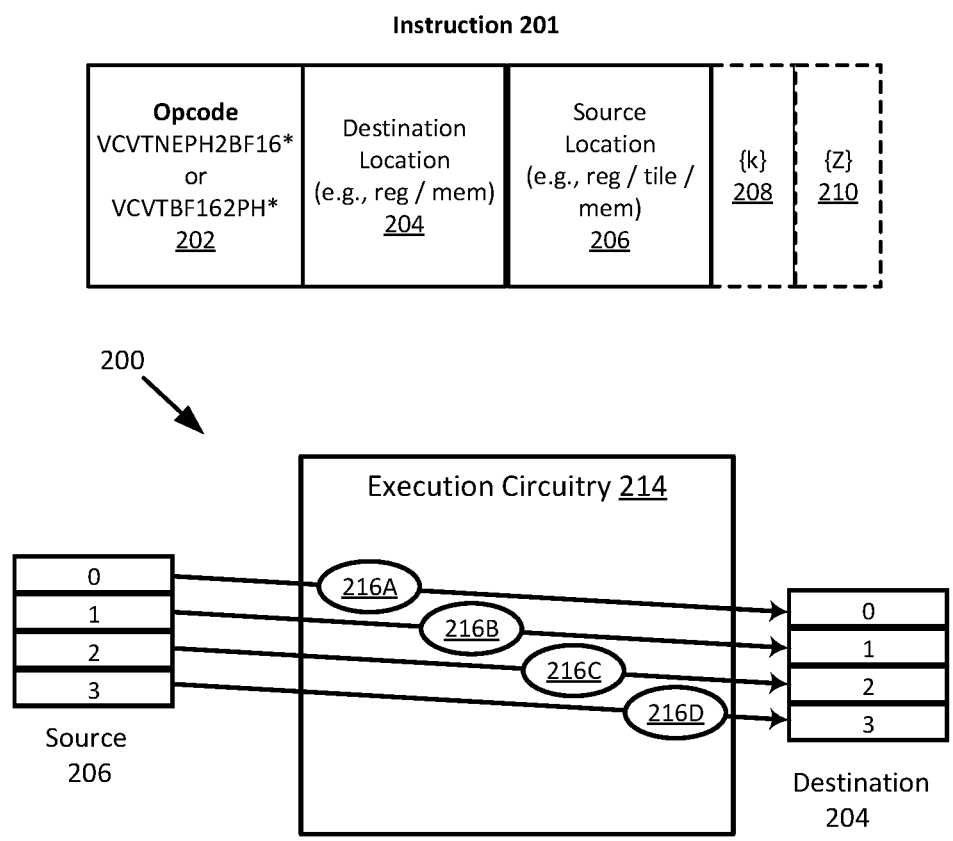
FIG. 2 is a block diagram illustrating execution of a format-convert (VCVTNEPH2BF16 or VCVTBF162PH) instruction according to embodiments of the disclosure.

FIG. 2 is a block diagram illustrating execution of a format-convert (VCVTNEPH2BF16 or VCVTBF162PH) instruction 201 according to embodiments of the disclosure.

As shown, computing apparatus 200 (e.g., a processor) is to receive, fetch, and decode (e.g., via fetch and decode circuitry shown in FIG. 1) format-convert (VCVTNEPH2BF16 or VCVTBF162PH) instruction 201. Format-convert instruction 201 includes fields to specify opcode 202 (VCVTNEPH2BF16 or VCVTBF162PH) and a source location 206 (e.g., a vector register) of a vector comprising N number of 16-bit floating-point elements in a first format (e.g., one of a IEEE float16 format or a bfloat16 format), and a destination location 204 (for example, a vector register, e.g., the same as the source location in certain embodiments) of a vector comprising (e.g., exactly) N number of 16-bit floating-point elements in a second, different format (e.g., the other of the IEEE float16 format or the bfloat16 format). As depicted, N equals 4, and both specified source 206 and destination 204 vectors have four elements. It should be understood that N may be any number, or may be selectable only from a proper subset of numbers (e.g., only 8, 16, or 32). An exemplary processor register file is further illustrated and described, at least with respect to FIG. 8.

In some embodiments, format-convert instruction 201 also includes a mask {k} 208 and/or a zeroing control {z} 210.

In one embodiment of operation, computing apparatus 200 (e.g., a processor), is to fetch and decode, using fetch and decode circuitry, a VCVTNEPH2BF16 instruction 201 having fields to specify opcode 202 and source location 206 (e.g., vector register) of a vector of N number of 16-bit half-precision formatted elements (IEEE float16 elements) and destination location 204 (e.g., vector register) to store a vector of the resultant N number of 16-bit bfloat16 formatted elements(bfloat16 elements), the opcode to indicate the computing apparatus (e.g., processor) is to convert each of the elements of the source vector 206 from 16-bit half-precision format (IEEE float16 format) to 16-bit bfloat floating-point format (bfloat16 format) (for example, the converter circuits 216A-D to include truncation and rounding, e.g., as necessary), and store each converted element into a corresponding location of the specified destination vector 204. In certain embodiments, instruction 201 specifies one of a plurality of different vector lengths, e.g., 128 bits, 256 bits, 512 bits, or 1024 bits. Execution circuitry 214 here is to respond to the decoded instruction as specified by opcode 202, e.g., execution circuitry 117 in FIG. 1 being an instance of execution circuitry 214. In one embodiment, execution circuitry 214 (for example, the converter circuits 216A-D, e.g., one for each element) is not (e.g., 32-bit wide element) full-precision floating-point execution circuitry, for example, in one embodiment, each lane of the SIMD execution circuitry 214 (e.g., each corresponding lane into and/or out of the converter circuits 216A-D) is less than 32 bits wide (e.g., is 19 bits wide or 16 bits wide). In one embodiment, each lane of the SIMD execution circuitry 214 (e.g., each corresponding lane into and/or out of the converter circuits 216A-D) is 19 bits wide, e.g., such that the conversion (e.g., each converter circuit 216A-D) first is to convert from IEEE float 16 format, to a float19 format having a sign field (one bit wide), an exponent field (eight bits wide), and a mantissa (significand precision) field (ten bits implicitly stored, i.e., eleven bits wide explicitly stored), and then from float19 format (e.g., as an intermediate format) to bfloat16 format (e.g., by deleting the three lowest significant bits (LSBs) from the mantissa (significand precision) field).

In one embodiment of operation, computing apparatus 200 (e.g., a processor), is to fetch and decode, using fetch and decode circuitry, a VCVTBF162PH instruction 201 having fields to specify opcode 202 and source location 206 (e.g., vector register) of a vector of N number of 16-bit bfloat16 formatted elements (bfloat16 elements) and destination location 204 (e.g., vector register) to store a vector of the resultant N number of 16-bit half-precision formatted elements (IEEE float16 elements), the opcode to indicate the computing apparatus (e.g., processor) is to convert each of the elements of the source vector 206 from 16-bit bfloat floating-point format (e.g., bfloat16 format) to 16-bit half-precision format (IEEE float16 format) (for example, the converter circuits 216A-D to include truncation and rounding, e.g., as necessary), and store each converted element into a corresponding location of the specified destination vector 204. In certain embodiments, instruction 201 specifies one of a plurality of different vector lengths, e.g., 128 bits, 256 bits, 512 bits, or 1024 bits. Execution circuitry 214 here is to respond to the decoded instruction as specified by opcode 202, e.g., execution circuitry 117 in FIG. 1 being an instance of execution circuitry 214. In one embodiment, execution circuitry 214 (for example, the converter circuits 216A-D, e.g., one for each element) is not (e.g., 32-bit wide element) full-precision floating-point execution circuitry, for example, in one embodiment, each lane of the SIMD execution circuitry 214 (e.g., each corresponding lane into and/or out of the converter circuits 216A-D) is less than 32 bits wide (e.g., is 19 bits wide or 16 bits wide).

FIG. 3A illustrates exemplary first instruction format (e.g., EVEX) encoding pseudocode 315 and exemplary second instruction format (e.g., VEX) encoding pseudocode 325 for a VCVTNEPH2BF16 instruction according to embodiments of the disclosure. A further discussion of EVEX and VEX encoding formats is discussed below.

As shown, format-convert instruction 301 has fields to specify opcode 302 (VCVTNEPH2BF16), and locations of source 306 (src) and destination 304 (dest) vectors, which, according to constant vector VL, which is instantiated in the code and stands for "vector length," can be any of 128 bits, 256 bits, 512 bits, etc. In some embodiments, instruction 301 further has fields to specify a mask 308 and/or zeroing control 310.

Depicted first instruction format (e.g., EVEX) encoding version of conversion pseudocode 315 shows use of a writemask to control whether to mask each of the destination elements, with masked elements being either zeroed or merged (e.g., where the format-convert instruction in some embodiments includes fields to specify the mask and to control whether to zero or merge). In one embodiment, architectural machine specific register (MSR) (e.g., as one of registers 115 in FIG. 1) (e.g., MXCSR register storing control and/or status information for a SSE register) is read, e.g., to determine exception information (e.g., but certain instructions herein do, and other instructions herein do not, use any MXCSR round control information). In certain embodiments, evex.b==1 is a broadcast operation. In certain embodiments, [0] indicates a scalar and [i] indicates a vector register, with i being the element index. In certain embodiments, pseudocode 315 is to first convert half-precision (e.g., FP16) values to full-precision (e.g., FP32) values, and then convert the full-precision (e.g., FP32) values to bfloat16 values, e.g., according to pseudocode 340 in FIG. 3C.

Depicted second instruction format (e.g., VEX) encoding version of conversion pseudocode 335 does not use masking. In certain embodiments, pseudocode 335 is to first convert half-precision (e.g., FP16) values to full-precision (e.g., FP32) values, and then convert the full-precision (e.g., FP32) values to bfloat16 values, e.g., according to pseudocode 340 in FIG. 3C.

FIG. 3B illustrates exemplary first instruction format (e.g., EVEX) encoding pseudocode 335 and exemplary second instruction format (e.g., VEX) encoding pseudocode 345 for a VCVTBF162PH instruction according to embodiments of the disclosure. A further discussion of EVEX and VEX encoding formats is discussed below.

As shown, format-convert instruction 321 has fields to specify opcode 322 (VCVTBF162PH), and locations of source 326 (src) and destination 324 (dest) vectors, which, according to constant vector VL, which is instantiated in the code and stands for "vector length," can be any of 128 bits, 256 bits, 512 bits, etc. In some embodiments, instruction 321 further has fields to specify a mask 328 and/or zeroing control 330.

Depicted first instruction format (e.g., EVEX) encoding version of conversion pseudocode 335 shows use of a writemask to control whether to mask each of the destination elements, with masked elements being either zeroed or merged (e.g., where the format-convert instruction in some embodiments includes fields to specify the mask and to control whether to zero or merge). In one embodiment, an architectural machine specific register (MSR) (e.g., as one of registers 115 in FIG. 1) (e.g., MXCSR register storing control and/or status information for a SSE register) is read (e.g., as part of the execution of an instruction), e.g., to determine exception information (e.g., but certain instructions herein do, and other instructions herein do not, use any MXCSR round control information). In one embodiment, an architectural machine specific register (MSR) MXCSR register (e.g., MXCSR register storing control and/or status information for an SSE register) is not read (e.g., is not inspected and/or is not updated) (e.g., as part of the execution of an instruction). In certain embodiments, an instruction does not have exception(s). In certain embodiments, exception information for an instruction is implicit in the instruction, for example, with DAZ referring to a "denormals-are-zero" control (e.g., in an MSR), e.g., and DAZ=1 being implied for a bfloat16 operation (e.g., without consulting MXCSR) and/or DAZ=0 being implied for a FP16 operation (e.g., without consulting MXCSR).

In certain embodiments, evex.b==1 is a broadcast operation. In certain embodiments, [0] indicates a scalar and [i] indicates a vector register, with i being the element index.

Depicted second instruction format (e.g., VEX) encoding version of conversion pseudocode 345 does not use masking.

FIG. 3C illustrates exemplary pseudocode 340 of a helper function for use with the pseudocode of FIGS. 3A and 3B according to embodiments of the disclosure. Here, pseudocode 340 defines a helper function, convert_fp32_to_bfloat16( ), which converts from a full-precision 32-bit wide element format to a bfloat16 16-bit wide element format. Pseudocode 340 illustrates that disclosed embodiments, in contrast to a simple conversion that would just truncate the lower sixteen bits of the full-precision 32-bit wide floating-point number, advantageously performs rounding of normal numbers and considers a rounding bias (e.g., rounding_bias). Pseudocode 340 further illustrates that the disclosed format-convert instructions using this code have an improved rounding behavior than just truncating. The rounding behavior of disclosed embodiments facilitates more accurate computation than conversion by truncation. In some embodiments, execution circuitry adheres to rounding behavior according to rounding rules of a standard (e.g., rounding rules according to an IEEE 754 standard), for example, "NE" which indicates rounding to nearest even. In some embodiments, the rounding behavior is specified by the instruction, for example by including a corresponding suffix (e.g., "NE") in the opcode to indicate rounding (e.g., NE for rounding to Nearest Even). In one embodiment, rounding is according to the format in FIGS. 6A-WACD). In other embodiments, the rounding behavior adopts a default behavior, e.g., defaults "NE." In yet other embodiments, the rounding behavior is controlled by an architectural machine specific register (MSR) (e.g., as one of registers 115 in FIG. 1) (e.g., MXCSR) that is configured by software.

Pseudocode 340 also illustrates that disclosed embodiments perform truncation when necessary, for example if the input to the function is not a number (NaN).

FIG. 4A illustrates a method of processing a VCVTNEPH2BF16 instruction 401 according to embodiments of the disclosure. Format-convert instruction 401 includes fields to specify opcode 402 (VCVTNEPH2BF16) and source location 406 (e.g., vector register) of a vector of N number of 16-bit half-precision formatted elements (IEEE float16 elements) and destination location 404 (e.g., vector register) to store a vector of the resultant N number of 16-bit bfloat16 formatted elements(bfloat16 elements), the opcode to indicate the computing apparatus (e.g., processor) is to convert each of the elements of the source vector 206 from 16-bit half-precision format (IEEE float16 format) to 16-bit bfloat floating-point format (bfloat16 format).

As shown, the processor is to respond to a decoded format-convert instruction by performing flow 400. At 421, the processor is to fetch, using fetch circuitry, an instruction having fields to specify an opcode 402 (e.g., VCVTNEPH2BF16) and source location 406 (e.g., vector register) of a vector of N number of 16-bit half-precision formatted elements (IEEE float16 elements) and destination location 404 (e.g., vector register) to store a vector of the resultant N number of 16-bit bfloat16 formatted elements (bfloat16 elements), the opcode to indicate the computing apparatus (e.g., processor) is to convert each of the elements of the source vector 206 from 16-bit half-precision format (IEEE float16 format) to 16-bit bfloat floating-point format (e.g., bfloat16 format) (for example, via converter circuits 216A-D of FIG. 2 which, optionally, include truncation and rounding, e.g., as necessary), and store each converted element into a corresponding location of the specified destination vector 404. At 423, the processor is to decode, using decode circuitry, the fetched instruction. In some embodiments, the processor at 425 is to schedule execution of the decoded instruction. At 427, the processor is to respond, using execution circuitry, to the decoded instruction as specified by the opcode. In some embodiments, the processor at 429 is to commit a result of the executed instruction. Operations 425 and 429 are optional, as indicated by their dashed borders, insofar as they may occur at a different time, or not at all.

FIG. 4B illustrates a method of processing a VCVTBF162PH instruction 451 according to embodiments of the disclosure. Format-convert instruction 451 includes fields to specify opcode 452 (VCVTBF162PH) and source location 456 (e.g., vector register) of a vector of N number of 16-bit bfloat16 formatted elements(bfloat16 elements) and destination location 454 (e.g., vector register) to store a vector of the resultant N number of 16-bit half-precision formatted elements (IEEE float16 elements), the opcode to indicate the computing apparatus (e.g., processor) is to convert each of the elements of the source vector 456 from 16-bit bfloat floating-point format (bfloat16 format) to 16-bit half-precision format (IEEE float16 format).

As shown, the processor is to respond to a decoded format-convert instruction by performing flow 450. At 471, the processor is to fetch, using fetch circuitry, an instruction having fields to specify an opcode 452 (e.g., VCVTBF162PH) and source location 456 (e.g., vector register) of a vector of N number of 16-bit bfloat16 formatted elements(bfloat16 elements) and destination location 454 (e.g., vector register) to store a vector of the resultant N number of 16-bit half-precision formatted elements (IEEE float16 elements), the opcode to indicate the computing apparatus (e.g., processor) is to convert each of the elements of the source vector 456 from 16-bit bfloat floating-point format (e.g., bfloat16 format) to 16-bit half-precision format (IEEE float16 format) (for example, via converter circuits 216A-D of FIG. 2 which, optionally, include truncation and rounding, e.g., as necessary), and store each converted element into a corresponding location of the specified destination vector 454. At 473, the processor is to decode, using decode circuitry, the fetched instruction. In some embodiments, the processor at 475 is to schedule execution of the decoded instruction. At 477, the processor is to respond, using execution circuitry, to the decoded instruction as specified by the opcode. In some embodiments, the processor at 479 is to commit a result of the executed instruction. Operations 475 and 479 are optional, as indicated by their dashed borders, insofar as they may occur at a different time, or not at all.

FIG. 5A is a block diagram illustrating a format of a VCVTNEPH2BF16 instruction 500 according to embodiments of the disclosure. As shown, format-convert instruction 500 includes fields for specifying an opcode 502 (VCVTNEPH2BF16), and locations of destination 504 and source 506 vectors. The source and destination vectors can each be located in registers or in memory.

Opcode 502 is shown including an asterisk, which signifies that various optional fields can be added as prefixes and/or suffixes to the opcode. Namely, format-convert instruction 500 further depicts optional parameters to affect instruction behavior, including mask {k} 508, zeroing control {z} 510, element format 514, vector size (N) 516, and rounding mode 518. One or more of instruction modifiers 508, 510, 514, 516, and/or 518, may be specified using prefixes or suffixes to opcode 502.

In some embodiments, one or more of optional instructions modifiers 508, 510, 514, 516, and/or 518, are encoded in an immediate field of the instruction that is optionally included with the instruction 500. In some embodiments, one or more of optional instructions modifiers 508, 510, 514, 516, and/or 518 are specified via a configuration register, such as model-specific registers (MSRs) included in the instruction set architecture.

FIG. 5B is a block diagram illustrating a format of a VCVTBF162PH instruction 550 according to embodiments of the disclosure. As shown, format-convert instruction 550 includes fields for specifying an opcode 502 (VCVTBF162PH), and locations of destination 554 and source 556 vectors. The source and destination vectors can each be located in registers or in memory.

Opcode 552 is shown including an asterisk, which signifies that various optional fields can be added as prefixes and/or suffixes to the opcode. Namely, format-convert instruction 550 further depicts optional parameters to affect instruction behavior, including mask {k} 558, zeroing control {z} 560, element format 564, vector size (N) 566, and rounding mode 568. One or more of instruction modifiers 558, 560, 564, 566, and/or 568, may be specified using prefixes or suffixes to opcode 552.

In some embodiments, one or more of optional instructions modifiers 558, 560, 564, 566, and/or 568, are encoded in an immediate field of the instruction that is optionally included with the instruction 550. In some embodiments, one or more of optional instructions modifiers 558, 560, 564, 566, and/or 568 are specified via a configuration register, such as model-specific registers (MSRs) included in the instruction set architecture.

Exemplary architectures, systems, etc. that the above may be used in are detailed below.

At least some embodiments of the disclosed technologies can be described in view of the following examples:

Example 1. An apparatus comprising:
fetch circuitry to fetch a single instruction having fields to specify an opcode and locations of a source vector comprising N plurality of 16-bit half-precision floating-point elements, and a destination vector to store N plurality of 16-bit bfloat floating-point elements, the opcode to indicate execution circuitry is to convert each of the elements of the source vector from 16-bit half-precision floating-point format to 16-bit bfloat floating-point format and store each converted element into a corresponding location of the destination vector;
decode circuitry to decode the fetched single instruction into a decoded single instruction; and
the execution circuitry to respond to the decoded single instruction as specified by the opcode.

Example 2. The apparatus of example 1, wherein the execution circuitry is not full-precision floating-point execution circuitry.

Example 3. The apparatus of example 1, wherein the execution circuitry is to perform a truncation as part of the conversion.

Example 4. The apparatus of example 1, wherein the execution circuitry is to perform a rounding as part of the conversion.

Example 5. The apparatus of example 4, wherein the rounding defaults to a nearest even rounding rule.

Example 6. The apparatus of example 4, wherein the rounding is controlled by an architectural control register of the apparatus.

Example 7. The apparatus of example 1, wherein N is selectable by a vector extension prefix of the single instruction from values of 8, 16, or 32.

Example 8. The apparatus of example 1, wherein the execution circuitry is to generate all N converted elements in parallel.

Example 9. A method comprising:
fetching, by fetch circuitry of a processor, a single instruction having fields that specify an opcode and locations of a source vector comprising N plurality of 16-bit half-precision floating-point elements, and a destination vector to store N plurality of 16-bit bfloat floating-point elements, the opcode indicating that execution circuitry is to convert each of the elements of the source vector from 16-bit half-precision floating-point format to 16-bit bfloat floating-point format and store each converted element into a corresponding location of the destination vector;
decoding, by decode circuitry of the processor, the fetched single instruction into a decoded single instruction; and
responding, by the execution circuitry, to the decoded single instruction as specified by the opcode.

Example 10. The method of example 9, wherein the execution circuitry is not full-precision floating-point execution circuitry.

Example 11. The method of example 9, wherein the execution circuitry performs a truncation as part of the conversion.

Example 12. The method of example 9, wherein the execution circuitry performs a rounding as part of the conversion.

Example 13. The method of example 12, wherein the rounding defaults to a nearest even rounding rule.

Example 14. The method of example 12, wherein the rounding is controlled by an architectural control register of the processor.

Example 15. The method of example 9, wherein N is selectable by a vector extension prefix of the single instruction from values of 8, 16, or 32.

Example 16. The method of example 9, wherein the execution circuitry generates all N converted elements in parallel.

Example 17. A non-transitory machine readable medium that stores code that when executed by a machine causes the machine to perform a method comprising:
fetching, by fetch circuitry of a processor, a single instruction having fields that specify an opcode and locations of a source vector comprising N plurality of 16-bit half-precision floating-point elements, and a destination vector to store N plurality of 16-bit bfloat floating-point elements, the opcode indicating that execution circuitry is to convert each of the elements of the source vector from 16-bit half-precision floating-point format to 16-bit bfloat floating-point format and store each converted element into a corresponding location of the destination vector;
decoding, by decode circuitry of the processor, the fetched single instruction into a decoded single instruction; and
responding, by the execution circuitry, to the decoded single instruction as specified by the opcode.

Example 18. The non-transitory machine readable medium of example 17, wherein the execution circuitry is not full-precision floating-point execution circuitry.

Example 19. The non-transitory machine readable medium of example 17, wherein the execution circuitry performs a truncation as part of the conversion.

Example 20. The non-transitory machine readable medium of example 17, wherein the execution circuitry performs a rounding as part of the conversion.

Example 21. The non-transitory machine readable medium of example 20, wherein the rounding defaults to a nearest even rounding rule.

Example 22. The non-transitory machine readable medium of example 20, wherein the rounding is controlled by an architectural control register of the processor.

Example 23. The non-transitory machine readable medium of example 17, wherein N is selected by a vector extension prefix of the single instruction from values of 8, 16, or 32.

Example 24. The non-transitory machine readable medium of example 17, wherein the execution circuitry generates all N converted elements in parallel.

Example 25. A processor comprising:
fetch circuitry to fetch a single instruction having fields to specify an opcode and locations of a source vector comprising N plurality of 16-bit bfloat floating-point elements, and a destination vector to store N plurality of 16-bit half-precision floating-point elements, the opcode to indicate execution circuitry is to convert each of the elements of the source vector from 16-bit bfloat floating-point format to 16-bit half-precision floating-point format and store each converted element into a corresponding location of the destination vector;
decode circuitry to decode the fetched single instruction into a decoded single instruction; and
the execution circuitry to respond to the decoded single instruction as specified by the opcode.

Example 26. The processor of example 25, wherein the execution circuitry is not full-precision floating-point execution circuitry.

Example 27. The processor of example 25, wherein the execution circuitry is to perform a truncation as part of the conversion.

Example 28. The processor of example 25, wherein the execution circuitry is to perform a rounding as part of the conversion.

Example 29. The processor of example 28, wherein the rounding defaults to a nearest even rounding rule.

Example 30. The processor of example 28, wherein the rounding is controlled by an architectural control register of the processor.

Example 31. The processor of example 25, wherein N is selectable by a vector extension prefix of the single instruction from values of 8, 16, or 32.

Example 32. The processor of example 25, wherein the execution circuitry is to generate all N converted elements in parallel.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
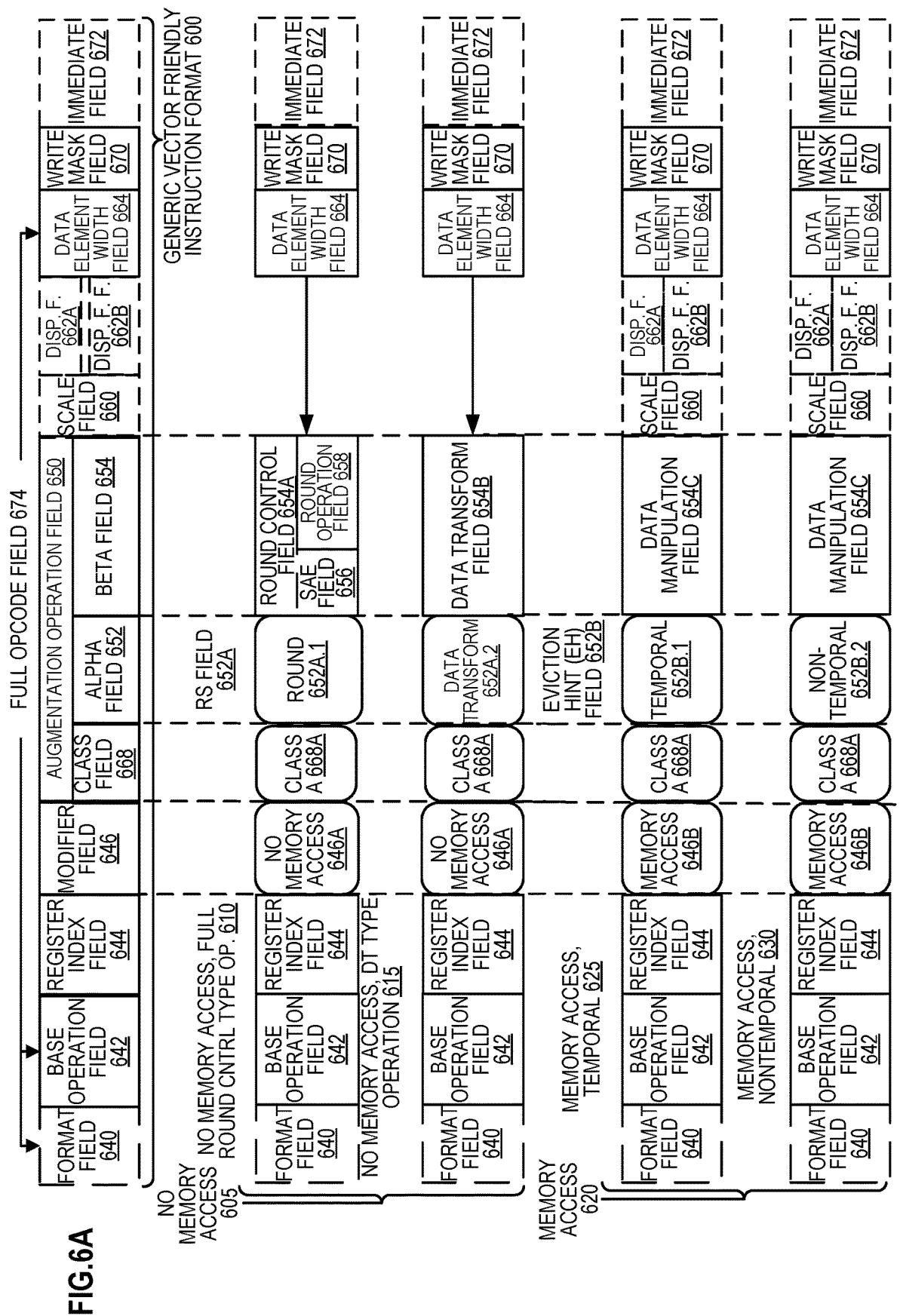
FIG. 6A is a block diagram illustrating a generic vector friendly instruction format and class A instruction templates thereof according to embodiments of the disclosure.
Figure 6B:
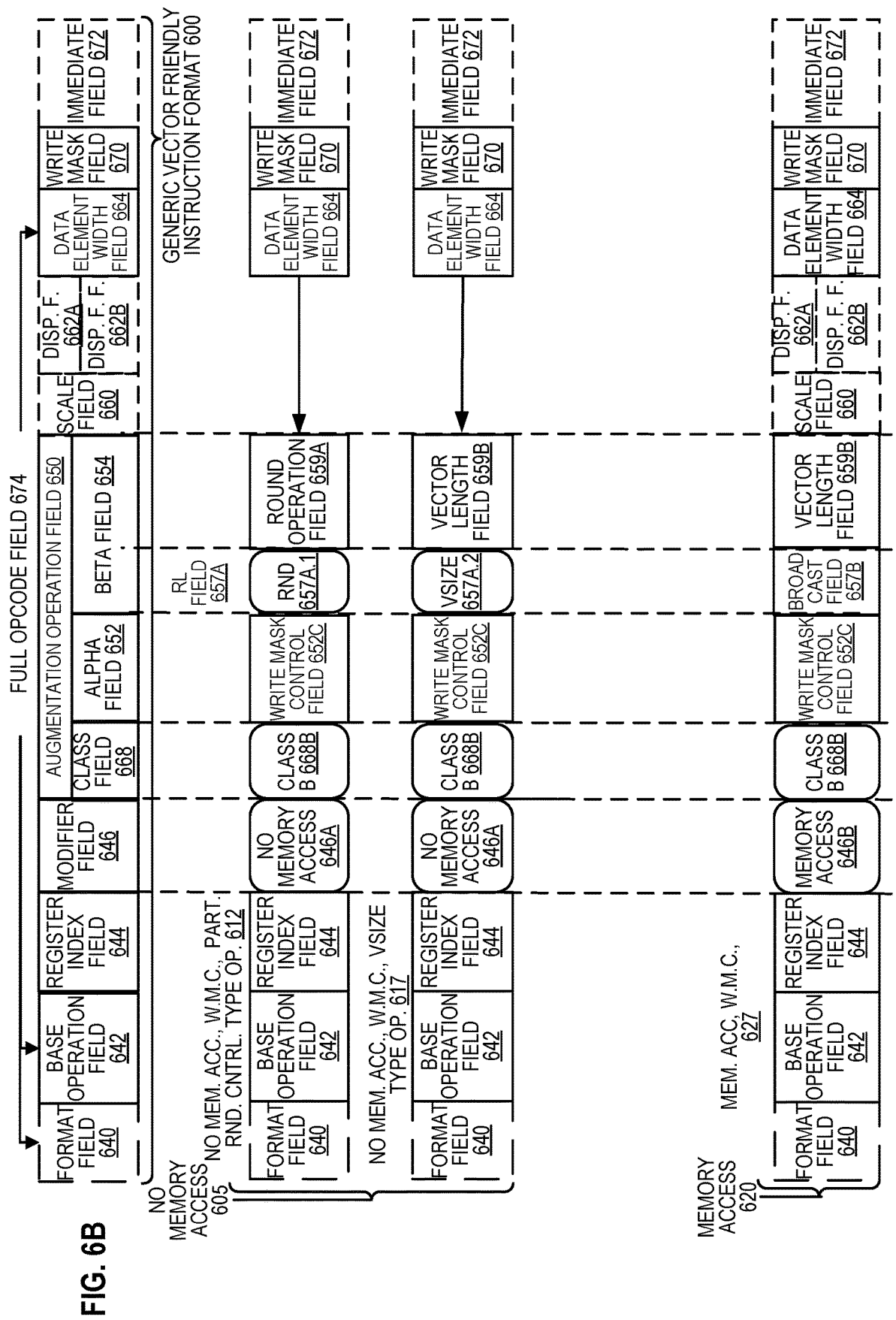
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*index+base$).

Displacement Field 662A—its content is used as part of memory address generation (e.g., for address generation that uses $2^{scale}*index+base+displacement$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that it is not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the Mod RM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
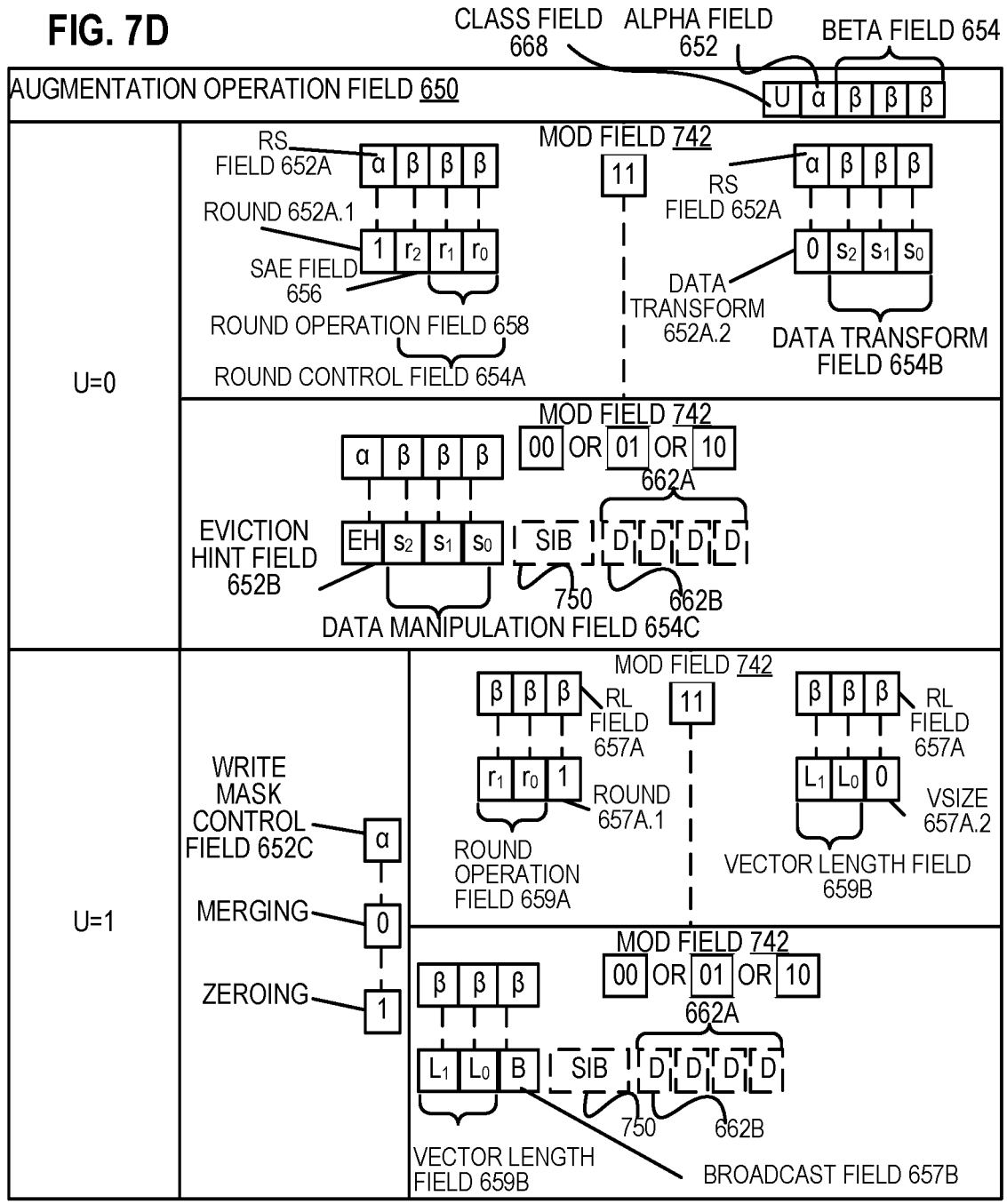
FIG. 7D is a block diagram illustrating the fields of the specific vector friendly instruction format in FIG. 7A that make up the augmentation operation field 650 according to one embodiment of the disclosure.

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
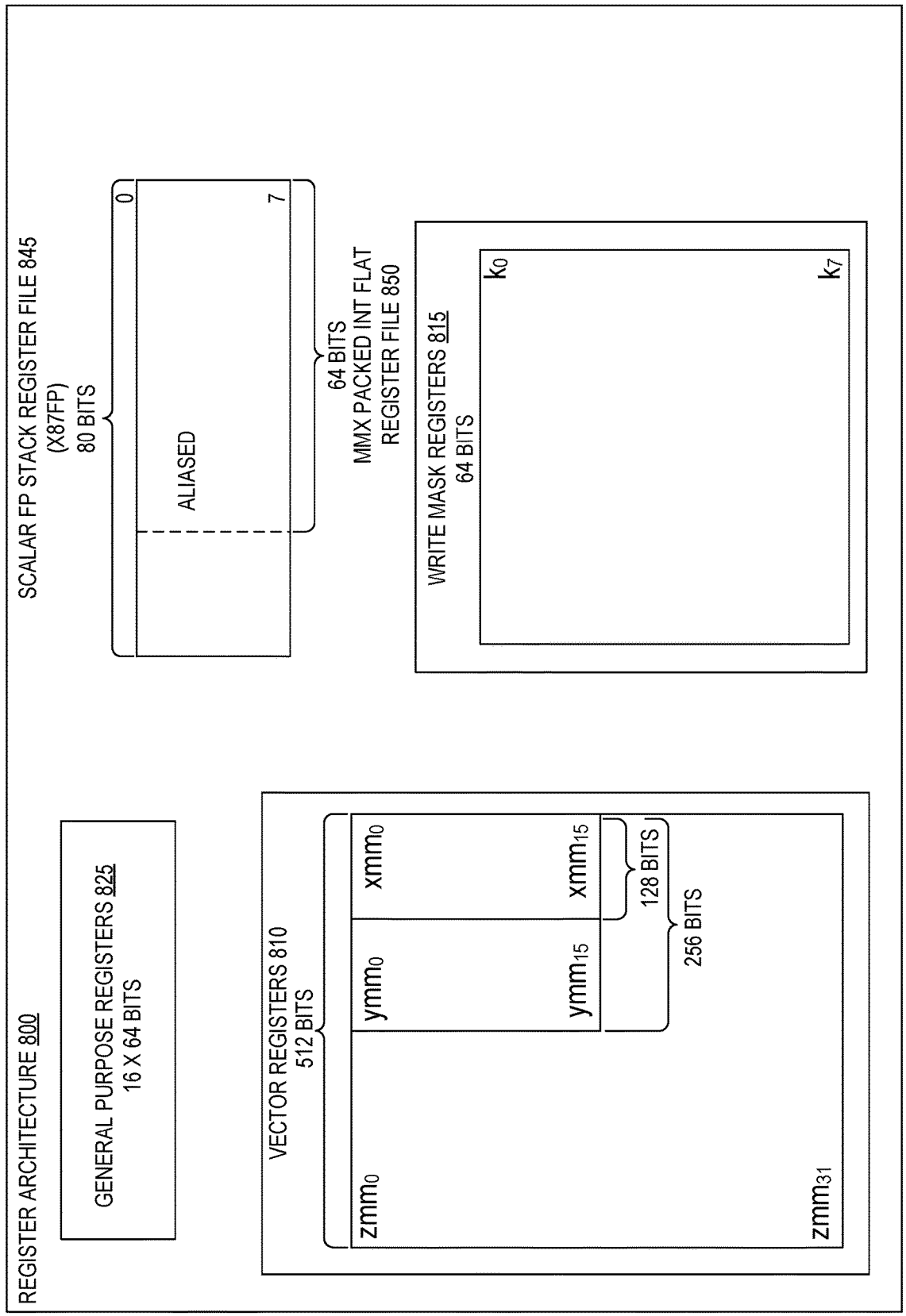
FIG. 8 is a block diagram of a register architecture according to one embodiment of the disclosure

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B | cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

In certain embodiments, a prefetch circuit 978 is included to prefetch data, for example, to predict access addresses and bring the data for those addresses into a cache or caches (e.g., from memory 980).

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
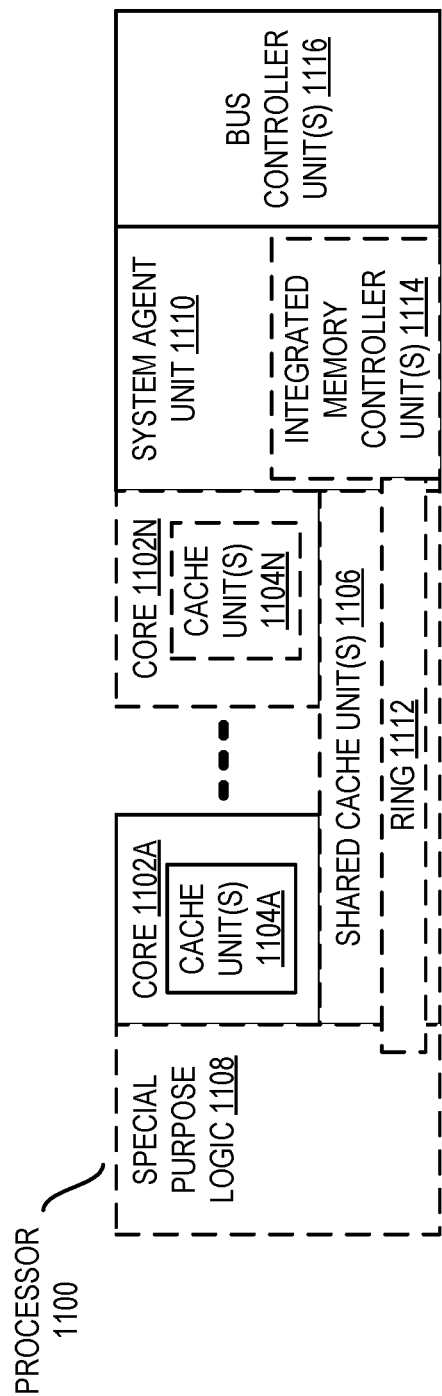
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
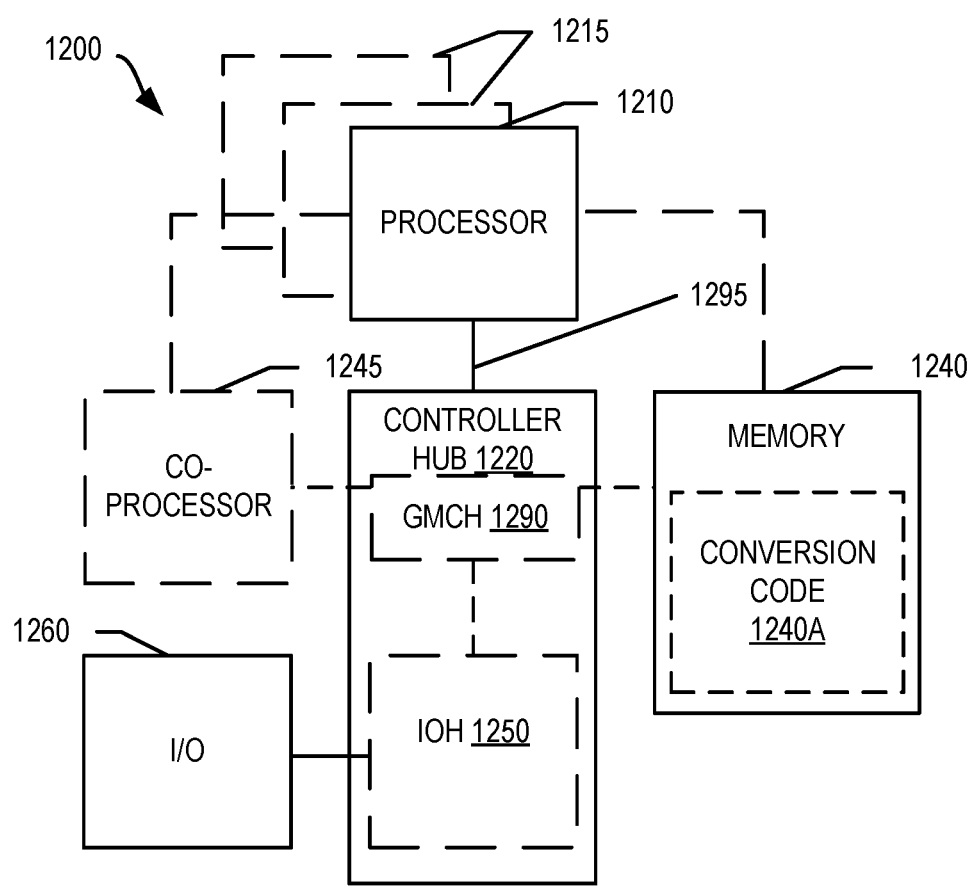
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include conversion code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
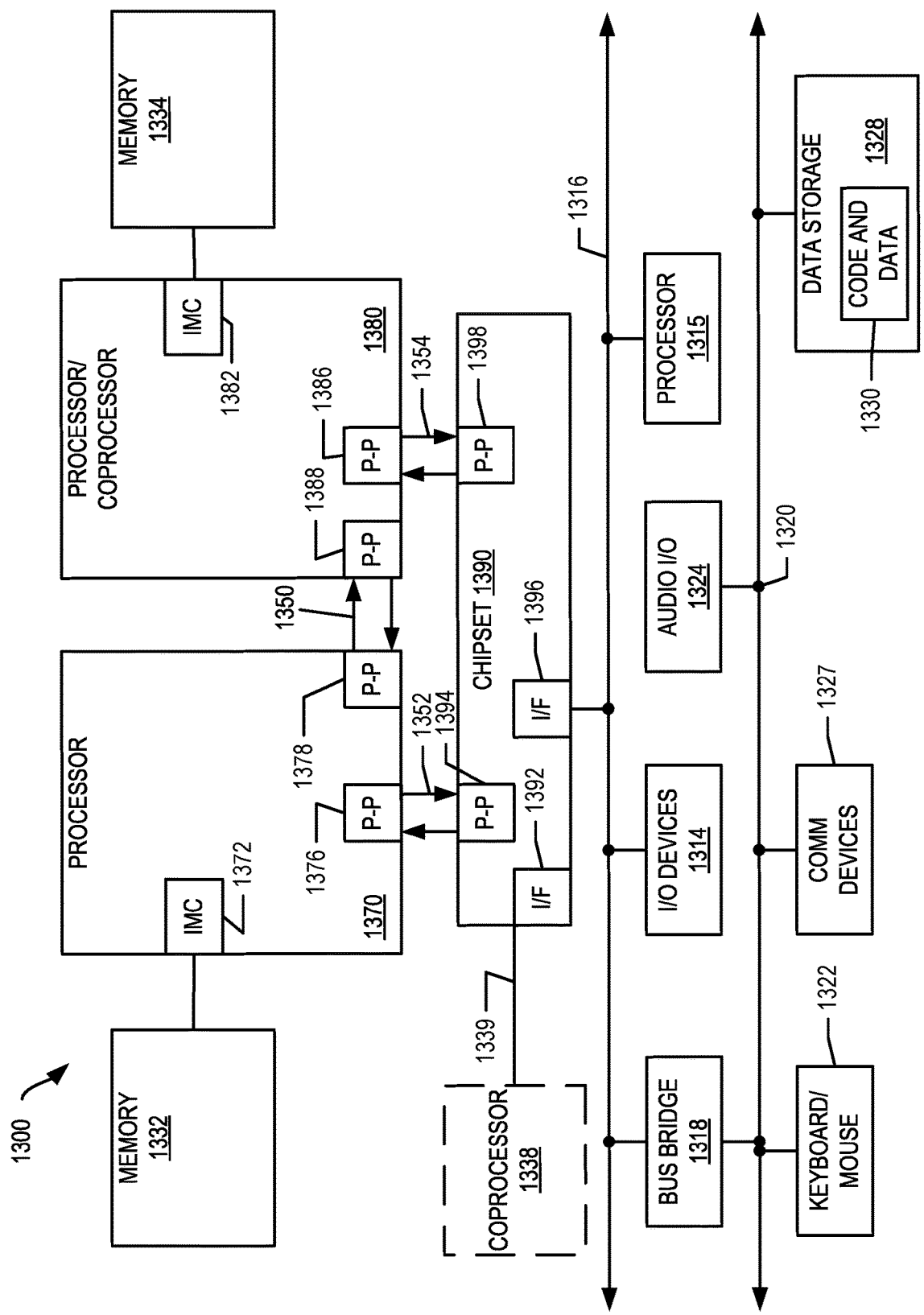
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
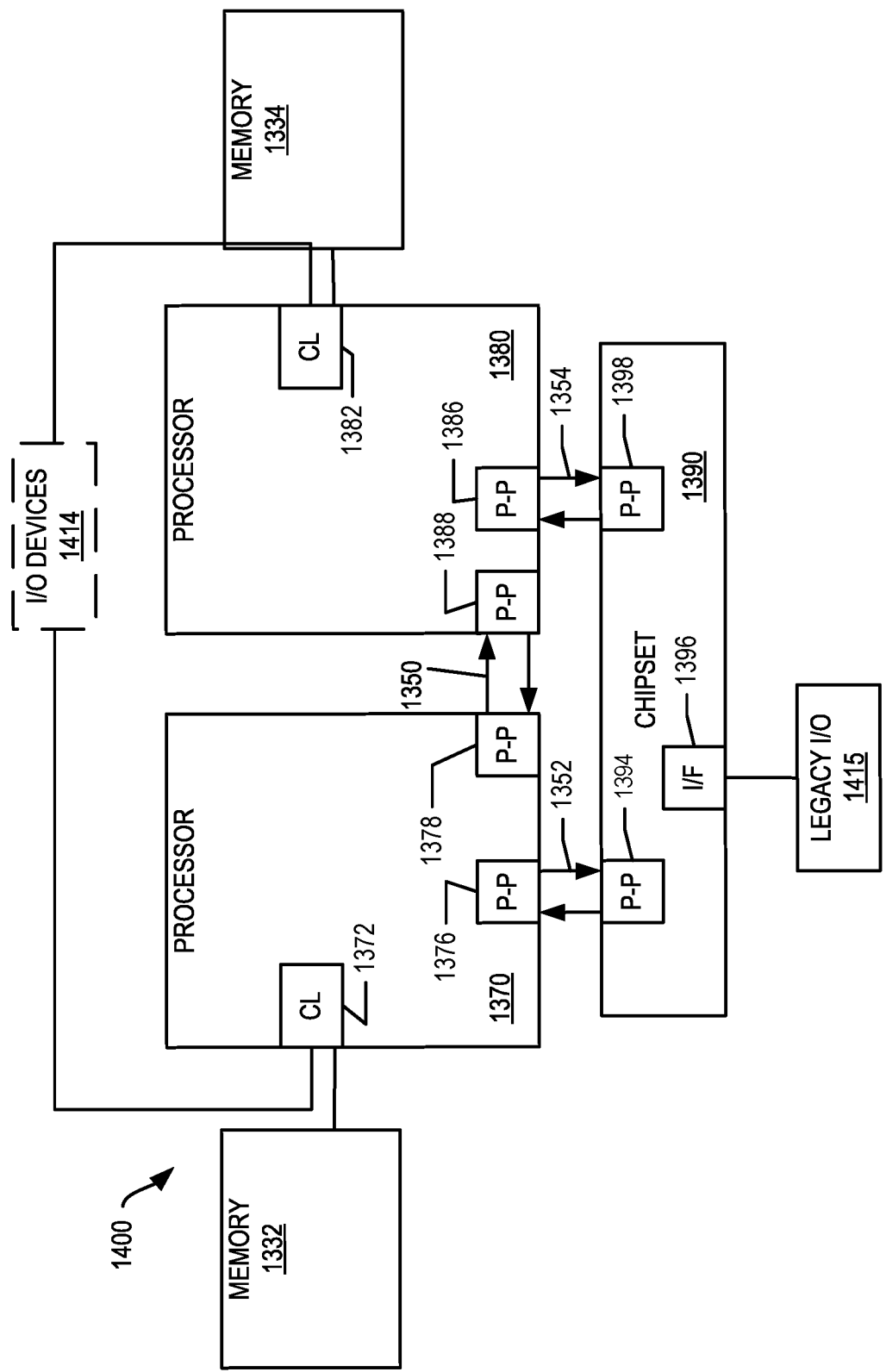
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
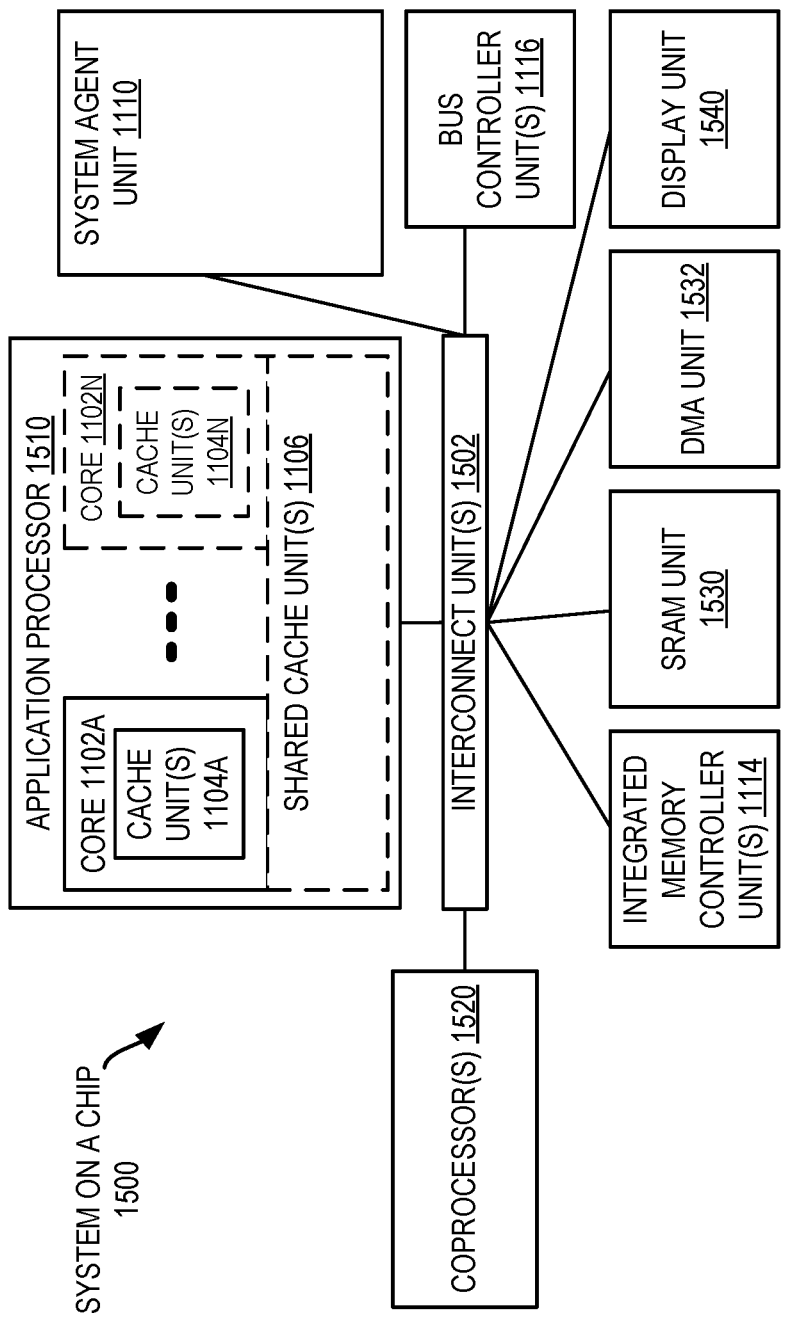
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
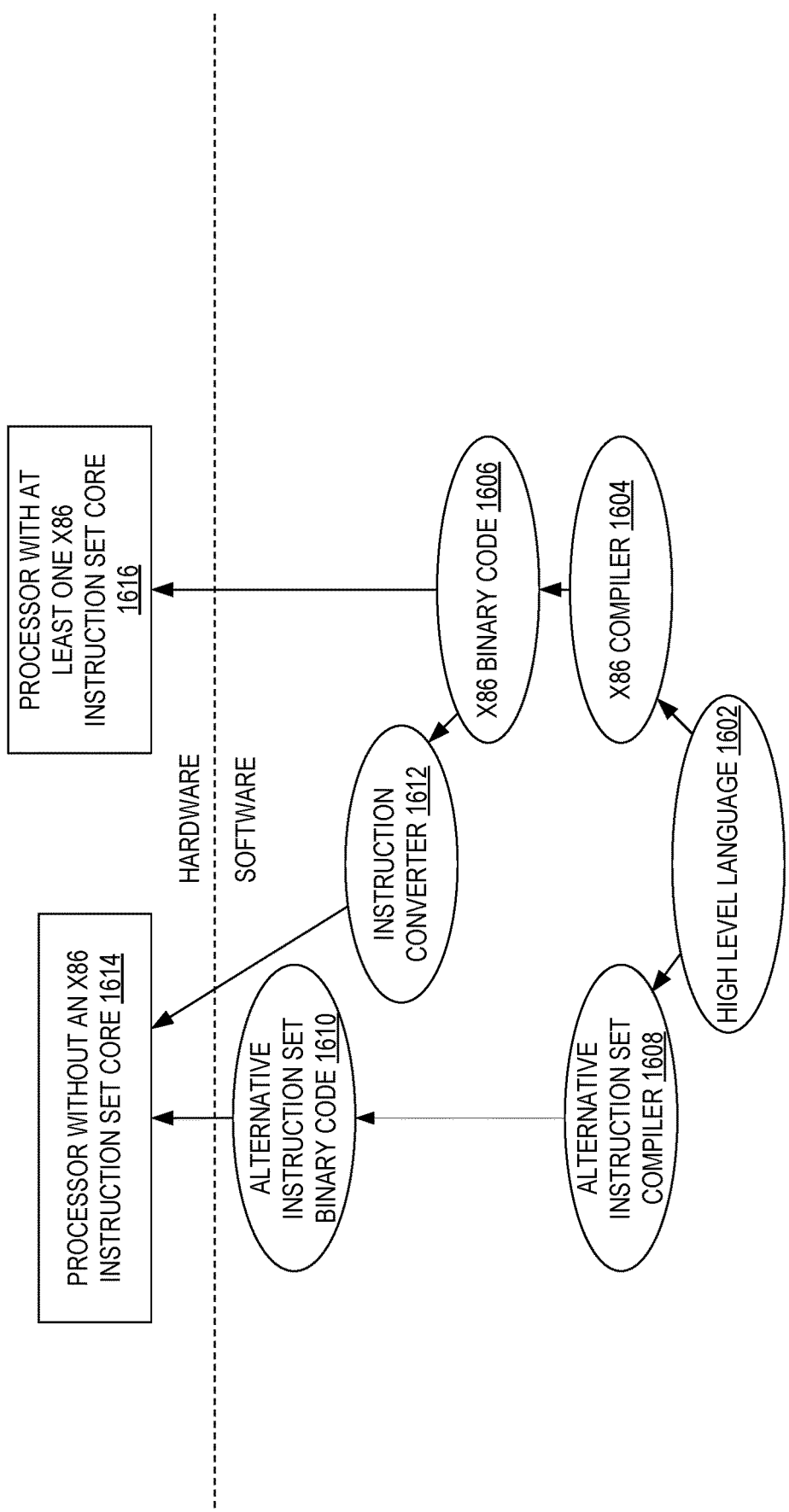
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
    fetch circuitry to fetch a single instruction having fields to specify an opcode and locations of a source vector comprising N plurality of 16-bit half-precision floating-point elements, and a destination vector to store N plurality of 16-bit bfloat floating-point elements, the opcode to indicate execution circuitry is to convert each of the elements of the source vector from 16-bit half-precision floating-point format to 32-bit full-precision floating point format, and then convert each of the elements from the 32-bit full-precision floating point format to 16-bit bfloat floating-point format in parallel by a respective converter circuit of a plurality of converter circuits of the execution circuitry, and store each converted 16-bit bfloat floating-point element into a corresponding location of the destination vector;
    decode circuitry to decode the fetched single instruction into a decoded single instruction and
    the execution circuitry to respond to the decoded single instruction as specified by the opcode.

2. The apparatus of claim 1, wherein the execution circuitry is to perform a truncation as part of one or more of the conversions.

3. The apparatus of claim 1, wherein the execution circuitry is to perform a rounding as part of one or more of the conversions.

4. The apparatus of claim 3, wherein the rounding defaults to a nearest even rounding rule.

5. The apparatus of claim 3, wherein the rounding is controlled by an architectural control register of the apparatus.

6. The apparatus of claim 1, wherein N is selectable by a vector extension prefix of the single instruction from values of 8, 16, or 32.

7. A method comprising:
    fetching, by fetch circuitry of a processor, a single instruction having fields that specify an opcode and locations of a source vector comprising N plurality of 16-bit half-precision floating-point elements, and a destination vector to store N plurality of 16-bit bfloat floating-point elements, the opcode indicating that execution circuitry is to convert each of the elements of the source vector from 16-bit half precision floating-point format to 32-bit full-precision floating point format, and then convert each of the elements from the 32-bit full-precision floating point format to 16-bit bfloat floating-point format in parallel by a respective converter circuit of a plurality of converter circuits of the execution circuitry, and store each converted 16-bit bfloat floating-point element into a corresponding location of the destination vector;
    decoding, by decode circuitry of the processor, the fetched single instruction into a decoded single instruction; and
    responding, by the execution circuitry, to the decoded single instruction as specified by the opcode.

8. The method of claim 7, wherein the execution circuitry performs a truncation as part of one or more of the conversions.

9. The method of claim 7, wherein the execution circuitry performs a rounding as part of one or more of the conversions.

10. The method of claim 9, wherein the rounding defaults to a nearest even rounding rule.

11. The method of claim 9, wherein the rounding is controlled by an architectural control register of the processor.

12. The method of claim 7, wherein N is selectable by a vector extension prefix of the single instruction from values of 8, 16, or 32.

13. A non-transitory machine readable medium that stores code that when executed by a machine causes the machine to perform a method comprising:
    fetching, by fetch circuitry of a processor, a single instruction having fields that specify an opcode and locations of a source vector comprising N plurality of 16-bit half-precision floating-point elements, and a destination vector to store N plurality of 16-bit bfloat floating-point elements, the opcode indicating that execution circuitry is to convert each of the elements of the source vector from 16-bit half-precision floating-point format to 32-bit full-precision floating point format, and then convert each of the elements from the 32-bit full-precision floating point format to 16-bit bfloat floating-point format in parallel by a respective converter circuit of a plurality of converter circuits of the execution circuitry, and store each converted 16-bit bfloat floating-point element into a corresponding location of the destination vector;

decoding, by decode circuitry of the processor, the fetched single instruction into a decoded single instruction; and responding, by the execution circuitry, to the decoded single instruction as specified by the opcode.

14. The non-transitory machine readable medium of claim 13, wherein the execution circuitry performs a truncation as part of one or more of the conversions.

15. The non-transitory machine readable medium of claim 13, wherein the execution circuitry performs a rounding as part of one or more of the conversions.

16. The non-transitory machine readable medium of claim 15, wherein the rounding defaults to a nearest even rounding rule.

17. The non-transitory machine readable medium of claim 15, wherein the rounding is controlled by an architectural control register of the processor.

18. The non-transitory machine readable medium of claim 13, wherein N is selectable by a vector extension prefix of the single instruction from values of 8, 16, or 32.

* * * * *